US008056129B2

(12) United States Patent
Gusler et al.

(10) Patent No.: US 8,056,129 B2
(45) Date of Patent: Nov. 8, 2011

(54) VALIDATING ACTIVE COMPUTER TERMINAL SESSIONS

(75) Inventors: Carl P. Gusler, Austin, TX (US); Rick A. Hamilton, II, Charlottesville, VA (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1218 days.

(21) Appl. No.: 11/737,452

(22) Filed: Apr. 19, 2007

(65) Prior Publication Data

US 2008/0263636 A1 Oct. 23, 2008

(51) Int. Cl.
*H04L 9/32* (2006.01)
(52) U.S. Cl. .............................. 726/22; 726/4
(58) Field of Classification Search ................ 726/9, 26, 726/27, 28, 29, 22; 713/224, 201, 212, 213, 713/220, 223; 380/200, 201, 202, 203, 277; 709/204, 201, 220, 227
See application file for complete search history.

(56) References Cited

U.S. PATENT DOCUMENTS

| | | | | |
|---|---|---|---|---|
| 5,937,159 | A * | 8/1999 | Meyers et al. ................. | 726/20 |
| 2004/0034788 | A1 | 2/2004 | Ross | |
| 2004/0073813 | A1 | 4/2004 | Pinkas et al. | |
| 2005/0015257 | A1 | 1/2005 | Bronstein | |
| 2005/0065802 | A1 | 3/2005 | Rui et al. | |
| 2005/0091388 | A1* | 4/2005 | Kamboh et al. ............... | 709/228 |
| 2005/0120201 | A1 | 6/2005 | Benaloh et al. | |
| 2005/0193208 | A1 | 9/2005 | Charrette, III et al. | |
| 2006/0168202 | A1 | 7/2006 | Reshef et al. | |
| 2008/0209223 | A1* | 8/2008 | Nandy et al. .................. | 713/185 |

OTHER PUBLICATIONS

Allison L. Coates et al, "Pessimal Print: A Reverse Turing Test", IEEE, 2001, 0-7695-1263-1/01, pp. 1154, 1156 & 1158.

* cited by examiner

*Primary Examiner* — Vivek Srivastava
*Assistant Examiner* — Nega Woldemariam
(74) *Attorney, Agent, or Firm* — Patrick J. Daugherty; Driggs, Hogg, Daugherty & Del Zoppo Co., LPA

(57) ABSTRACT

Systems, methods and program codes are provided wherein an analyzer analyzes input from a terminal device; ascertains human-like behavior; and terminates an active session, generates a time-out warning, manipulates an idle session timer or presents a challenge in response to a humanness likelihood determination or to a challenge result. In one aspect a keystroke analyzer and a command sequence analyzer determine whether the terminal device input is likely from a human user or from an automaton. In another aspect a Completely Automated Public Turing Test to tell Computers and Humans Apart challenge is presented. Timing characteristics include maximum generation rate, burstiness, and keystroke sequence delays, and command characteristics include a no-action-required characteristic and a query characteristic. A command sequence analyzer may have an affinity for a command line interface. Weighting algorithms or artificial intelligence routines may be applied to humanness likelihood outputs.

20 Claims, 3 Drawing Sheets

VALIDATING ACTIVE COMPUTER TERMINAL SESSIONS

FIELD OF THE INVENTION

The present invention relates to devices, and methods and systems for validating an active terminal session, and more particularly for determining whether an automaton is spoofing an open active session.

BACKGROUND OF THE INVENTION

Terminal devices such as remote computers, PDAs and cellular telephones are increasingly used to communicate with secure networks and secure network services through the Internet, WAN (wide area network), LAN (local area network) and other communication mediums. Although network and internet protocols (IP) generally provide reliable and scalable communications over real-world networks, such communications are inherently insecure. Thus secured networks accessed thereby are vulnerable to compromise by unauthorized third parties, for example by transmission eavesdropping, communication hijacking, IP spoofing and other techniques.

In order to maintain network security it is necessary to provide for secure terminal communications with terminal devices. For example, terminal devices may be required to utilize Secure Shell (SSH) network standards and protocols to establish a secure channel with the secure network resource. SSH generally uses public-key cryptography and message authentication codes to authenticate a remote terminal device and/or the user thereof and provide confidentiality and integrity of data exchanged between the two. In some configurations a user must supply a user identification and password to log on or otherwise initiate a SSH terminal session, thereby ensuring that the terminal session has been opened by an authorized user and that secure data and resources may be made available only to the extent authorized by the specific user identification and password provided. When the user is finished with the session and logs off or otherwise terminates the session, further access to the secure resources is denied absent another login of user ID and password.

However, once an SSH session is open security is maintained only if access to the session is limited to the authorized user(s). One problem arises when an authorized user fails to maintain full and active control of an open session to preclude unauthorized party access. For example, a logged-on and properly authorized user may abandon a terminal session without logging off to temporarily direct his attention or his actual physical presence away from an authorized terminal device, usually with the intention of quickly returning and resuming the session. In general the threat of unauthorized party access to secure network resources during an active and abandoned terminal session proportionately increases with the increases in the elapsed time of abandonment.

One simple, common and effective technique for minimizing secure network exposure to unauthorized parties through an unattended authorized secure terminal session is to "time out" the session after a predetermined period of idleness or inactivity. Thus where no user activity is evidenced by keystrokes or other inputs over an elapsed time out period the session manager may terminate the session, optionally by first prompting the user for an input proving his presence and active attention at the terminal device and then terminating the session if the prompt generates no meaningful reply. And in general, the shorter the time out period the lower the secure data exposure, and thus the higher the secure attribute of the secure session.

However, in real world applications providing for shorter time out periods may actually decrease network security. Users consider reinitiating terminated sessions inconvenient, time consuming and even emotionally aggravating, and thus are known to take steps to actively defeat time out mechanisms and keep idle sessions open well beyond defined idle periods. Accordingly it is known for authorized users to actively circumvent a time out period by running an automaton or other self-operating computer program on the authorized terminal device, thus imitating an active user by transmitting characters or commands on a regular basis and thereby spoofing the secure network into thinking a human user is actively working at the computer. For example an automaton may occasionally transmit a single "return," which is accepted by most terminal session SSH shells as a null operation, spoofing a network into perceiving that a user is still working during an idle session though no meaningful data operations are being performed. And although improved security techniques may require non-null characters to be transmitted within an idle time period, this may be easily circumvented by a program that transmits one or more harmless trivial commands, such as commands to display the time or date.

Although an authorized user may have no malicious intent in defeating idle time monitoring routines, system security is nonetheless breached significantly, particularly if a terminal device is left physically unattended during such an improperly extended time-out period.

SUMMARY OF THE INVENTION

According to the present invention a system for validating an active terminal session is provided comprising an idle session timer and at least one analyzer in communication with an authorized terminal device to analyze input from a terminal device and ascertain human-like behavior. The analyzer terminates the session, generates a time-out warning to the user or presents a challenge to the user in response to a determination that the terminal device input is likely from an automaton; manipulates the idle session timer in response to a determination that the terminal device input is likely from a human user or to the user passing the challenge; or terminates the session in response the user failing the challenge.

In another aspect the analyzer comprises a keystroke analyzer, a command sequence analyzer, a suspector to determine whether the terminal device input is likely from a human user or from an automaton from at least one of keystroke analyzer and sequence analyzer outputs; and a challenger configured to present a Completely Automated Public Turing Test to tell Computers and Humans Apart challenge to a terminal device user.

In another aspect timing characteristics may be maximum generation rate, burstiness, and keystroke sequence delays, and command characteristics may be no-action-required characteristic and a query characteristic. In another aspect the suspector may apply weighting algorithms or artificial intelligence routines. In another aspect the challenger may interrupt a user session and present the user with a URL showing where a challenge is being presented. The keystroke analyzer, the command sequence analyzer and the suspector may be implemented in a server portion or a client portion of a terminal session manager. And the command sequence analyzer may have an affinity for a command line interface.

In another aspect a method for validating an active terminal session is provided, comprising ascertaining a human-like behavior likelihood of an input from an authorized terminal device during the active terminal session and responsively generating at least one humanness likelihood output; determining whether the terminal device input is likely from a human user or from an automaton from the at least one humanness likelihood output; terminating the session, generating a time-out warning to the user or presenting a challenge to the user in response to determining that the input is likely from an automaton; manipulating an idle session timer in response to determining that the input is likely from a human user or to the user passing the challenge; and terminating the session in response the user failing the challenge. In one aspect ascertaining human-like behavior likelihood of the input comprises analyzing the input for a timing characteristic and for a command characteristic. In another aspect presenting a challenge comprises presenting a Completely Automated Public Turing Test to tell Computers and Humans Apart to the terminal user.

In one aspect of the method timing characteristics may be maximum generation rate, burstiness, and keystroke sequence delays, and command characteristics may be no-action-required characteristic and a query characteristic. In another aspect determining whether the terminal device input is likely from a human user or from an automaton from the at least one humanness likelihood output comprises applying weighting algorithms or applying artificial intelligence routines. And in another aspect presenting the challenge comprises presenting a specific URL to the user, the user directing a web browser to the specific URL on a web server, reviewing a query puzzle presented therein and providing an answer to the challenge to either a terminal server challenger or to an external server site accessed through the URL.

In another aspect a method is provided for producing computer executable program code, storing the produced program code on a computer readable medium, and providing the program code to be deployed to and executed on a computer system, for example by a service provider who offers to implement, deploy, and/or perform functions for others. Still further, an article of manufacture comprising a computer usable medium having the computer readable program embodied in said medium may be provided. The program code comprises instructions which, when executed on the computer system, cause the computer system to ascertain a human-like behavior likelihood of an input from an authorized terminal device during the active terminal session, determine whether the terminal device input is likely from a human user or from an automaton; terminate the session, generate a time-out warning to the user or present a challenge to the user in response to determining that the input is likely from an automaton; manipulate an idle session timer in response to determining that the input is likely from a human user or to the user passing the challenge; and terminate the session in response the user failing the challenge.

In one aspect the program code causes the computer system to analyze the input for a timing characteristic and a command characteristic. The program code may also cause the computer system to present a Completely Automated Public Turing Test to tell Computers and Humans Apart as the challenge. In one aspect the program code causes the computer system to apply weighting algorithms or artificial intelligence routines. The program code may also cause the computer system to present a challenge to the user by presenting a specific URL. The program code may also cause the computer system to implement keystroke and command sequence analysis. And the program code may cause the computer system to provide a command sequence analyzer with at least one affinity for at least one command line interface.

BRIEF DESCRIPTION OF THE DRAWINGS

These and other features of this invention will be more readily understood from the following detailed description of the various aspects of the invention taken in conjunction with the accompanying drawings in which.

Figure 1:
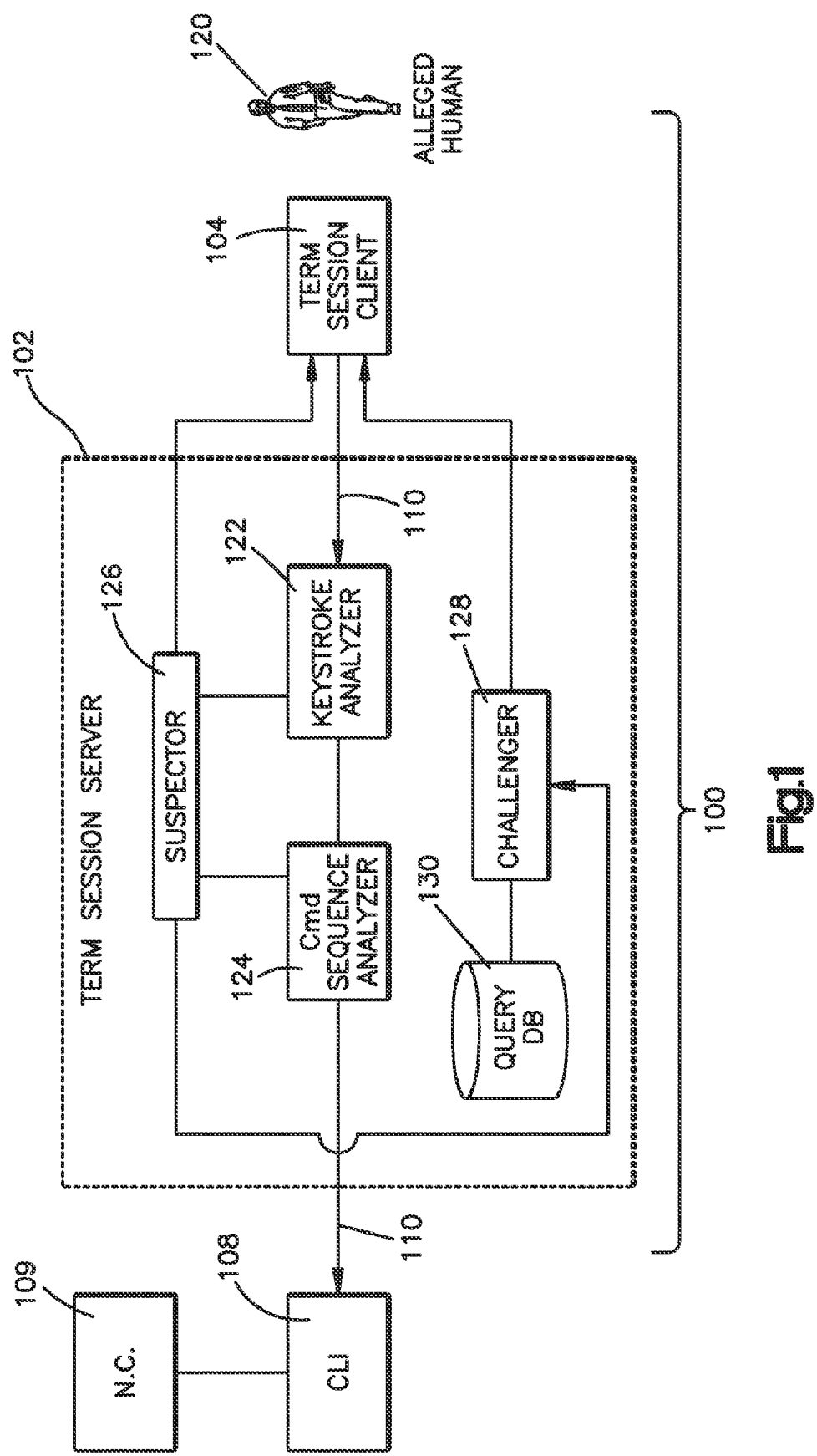
FIG. 1 illustrates a system for validating an active terminal session according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
 I. General Description
 II. Computerized Implementation
I. General Description Referring now to FIG. 1, a terminal session manager 100 is illustrated including a client portion 104 that runs on a user's 120 computer, PDA or other terminal device, and a server portion 102 that runs on a secure network computer resource being managed, used, or operated by the user 120. The client portion 104 commonly provides formatting output on a user's 120 display screen, accepts and forwards user keystrokes, and manages the transmitting and receiving of session data over a communications link 110. The server portion 102 provides a connection with a secure network or host computer's 109 command line interface (CLI) or user shell 108, wherein the server portion 102 also manages transmitting and receiving session data over the communications link 110.

The terminal session server portion 102 is configured to monitor an open session with the client portion 104 for idleness, and initiate termination of an open session if the client portion 104 is idle for a time period in excess of a predetermined time-out period. What is new is that the terminal session server portion 102 is also configured to monitor and analyze inputs from the client portion 104 and to ascertain human-like behavior attributes in the client portion 104 input to the server portion 102.

More particularly, in the present embodiment a keystroke analyzer 122 monitors the user's 120 keystrokes to detect programmed behavior. In one example the timing of keystrokes entered by the user 120 is measured and analyzed. Human keystrokes have a number of timing characteristics that may be observed: examples include maximum generation rate; burstiness, for example as indicated by keystroke intensity over a given time period; and predictable delays between certain keystrokes in specified sequences due to the ease or difficulty of the finger manipulations required to generate the specific sequences through QUERTY keyboards or other known input elements. The keystroke analyzer 122 thus observes and analyzes one or more keystroke characteristics indicated by user's keystroke sequences and/or timings. In some embodiments the keystroke analyzer 122 makes a determination that the keystroke inputs are being produced by a human or an automaton program; in other embodiments the keystroke analyzer 122 determines a quantifiable measurement of likelihood of human or automaton input generation and outputs the likelihood to a suspector 126 for determination, as is described more fully below.

A command sequence analyzer 124 is also provided to analyze text inputs from the client portion 104. The command sequence analyzer 124 has an affinity for a command line interface 108, and may have a plurality of affinities for the multiple CLIs 108 available on one or more specified computer systems or platforms. For example, a command sequence analyzer 124 for a Unix system is configured to perform simple parsing of Unix commands, while a command sequence analyzer 124 configured for a Windows system would be able to perform simple parsing of DOS commands. (Unix is a registered trademark of The Open Group in the United States and other countries; Windows and DOS are trademarks of Microsoft Corporation in the United States, other countries, or both). The command sequence analyzer 124 may also be programmed to have an affinity for other common interfaces likely to be invoked from a given platform. For example, a command sequence analyzer 124 for either Unix or Windows might include the ability to perform simple parsing of Tivoli Storage Manager commands, as this program is popular on such systems and includes its own CLI 108. (Tivoli Storage Manager is a trademark of IBM Corporation in the United States, other countries, or both).

The command sequence analyzer 124 is configured to parse user 120 command patterns to detect whether real work is being performed, or instead simple commands are being run that may provide the illusion of human activity but don't change the overall host computer's 109 state. In one example the command sequence analyzer 124 detects and recognizes simple "no activity" sequences comprising a plurality of "enter" key keystrokes not associated with any meaningful input. The command sequence analyzer 124 may also be configured to detect and recognize cycles of "look but don't change" commands which query for a host computer 109 response but do not change the overall host computer's 109 state: illustrative but not exhaustive examples include commands that prompt for current time, date, directory and/or local files. The sequence analyzer 124 may determine that the keystroke inputs are being produced by a human or an automaton program, or it may determine a quantifiable measurement of likelihood of human or automaton input generation and outputs the likelihood to the suspector 126 for determination.

The suspector 126 is provided to receive outputs from the keystroke analyzer 122 and/or the command sequence analyzer 124 and determine whether the user 120 is an authorized human user or an unauthorized entity. The suspector 126 may apply simple logic using one or more weighting algorithms, and alternatively or additionally apply sophisticated artificial intelligence (AI) routines to make decisions, reach conclusions and determine what action to take.

Thus the server portion 102 is configured to determine whether a user 120 is an authorized human user or an alternative unauthorized entity such as an unauthorized third party, computer, computer program or an automaton, and responsively decide whether to reset an idle timer or take other actions. Thus the suspector 126 may terminate the session, generate a time out warning to the user through the client portion 104, manipulate the time out clock (for example initiating start, stop, pause and/or reset clock commands), and/or issue a challenge through a challenger 128 to the user 120 to demonstrate an authorized human capability.

It is to be understood that alternate embodiments of the present invention may omit or provide for alternative structures of one or more of the keystroke analyzer 122, sequence analyzer 124 and suspector 126 elements and their relationships as described above. For example, the server portion may omit either of the keystroke analyzer 122 and sequence analyzer 124 elements and rely solely upon the remaining element 122/124 for determining client 104 input as either authorized human user or alternative unauthorized entity input. Or the suspector 126 may be omitted and the keystroke analyzer 122 and/or sequence analyzer 124 may directly perform the suspector 126 functions described above. In still further embodiments either of the keystroke analyzer 122 and sequence analyzer 124 may serve as condition-predicate devices for the other: thus the sequence analyzer 124 may only initiate and function upon output from the keystroke analyzer 122 indicating a suspected automaton presence, and vice versa. Still further combinations and embodiments may be apparent to one skilled in the art.

Examples of terminal session server portions 102 include those configured with Telnet, FTP and SSH protocols, although alternate session managers will be apparent to one skilled in the art. Moreover, although in the present embodiment the keystroke analyzer 122, command sequence analyzer 124, suspector 126, challenger 128 and challenge database means 130 are implemented as an addition or enhancement to a terminal session server portion 102, it is to be understood that one or more of the detection application components 122,124,128,128,130 may be implemented instead as an extension to the terminal session client portion 104 and/or a system component located external to the server portion 102 and the client portion 104 (for example an external device 330 illustrated in FIG. 3 and discussed below).

The challenger 128 is configured to generate one or more challenges to the user 120 to "prove" his or her humanity and/or session authorization. Thus the challenger 128 may prompt the user to reenter one or both of user ID or password entries, or issue some other challenge. In one aspect a plurality of challenges may be provided in a database means 130 associated with and in communication with the challenger 128.

One appropriate challenger 128 technique is the "Completely Automated Public Turing Test to tell Computers and Humans Apart" or CAPTCHA, which are trademarks of Carnegie Mellon University in the United States, other countries, or both. In one embodiment the challenger 128 may be configured to interrupt a user session and present the user 120 with a URL showing where a CAPTCHA challenge is being presented, wherein the user 120 would then direct a web browser to a specific URL on a web server and review some kind of query or puzzle presented there and provide an answer to the challenge at either the terminal server challenger 128 or at an external server site accessed through the URL. If answered successfully at a terminal session challenger 128 the session would continue where it left off, or if answered successfully over the web at an external site challenger 128 than an external site challenger 128 server may signal a terminal session manager portion 102 that validation was successful.

In some examples CAPTCHA methods may be implemented in text terminal sessions, including exemplary techniques used in other network applications such as signing up for email accounts or entering online contests. Exemplary text terminal session techniques include recognizing a pattern embedded in an array of ASCII characters, responding correctly to questions or riddles, or making sense of seemingly nonsensical character strings. Thus one advantage is provided in enabling the provision of more complex challenges in more complex visual or audio puzzles by incorporating robust external challenger 128 structures through an external web server, web browser and/or appropriate audio/video plug in software, for example by a service provider who offers to implement, deploy, and/or perform CAPTCHA functions for others.

Thus the keystroke analyzer 122, command sequence analyzer 124, suspector 126, challenger 128 and challenge database means 130 may be implemented, either apart or in combination, to allow secure session managers to ensure that remote sessions are kept alive only via authentic active user inputs and not thorough automaton of other spoofing techniques by monitoring keystrokes to ascertain human like behavior at a keyboard and/or by monitoring command sequences to detect useful work performed. And in one aspect challenges may be issued to users to prove that the user is actively monitoring the terminal.

Thus the present invention eliminates a simple automaton's ability to spoof keystrokes by monitoring keystrokes for a required human-like behavior at the keyboard, and by requiring more realistic keystroke timings. In another aspect the present invention eliminates an automaton's ability to spoof real activity through generating "dead hand" returns or simple command sequences by monitoring command inputs for meaningful command sequence characteristics. And in another aspect the present invention eliminates an automaton's ability to maintain an unoccupied session by requiring intelligent responses that comprehend a challenge through human perception.

Figure 2:
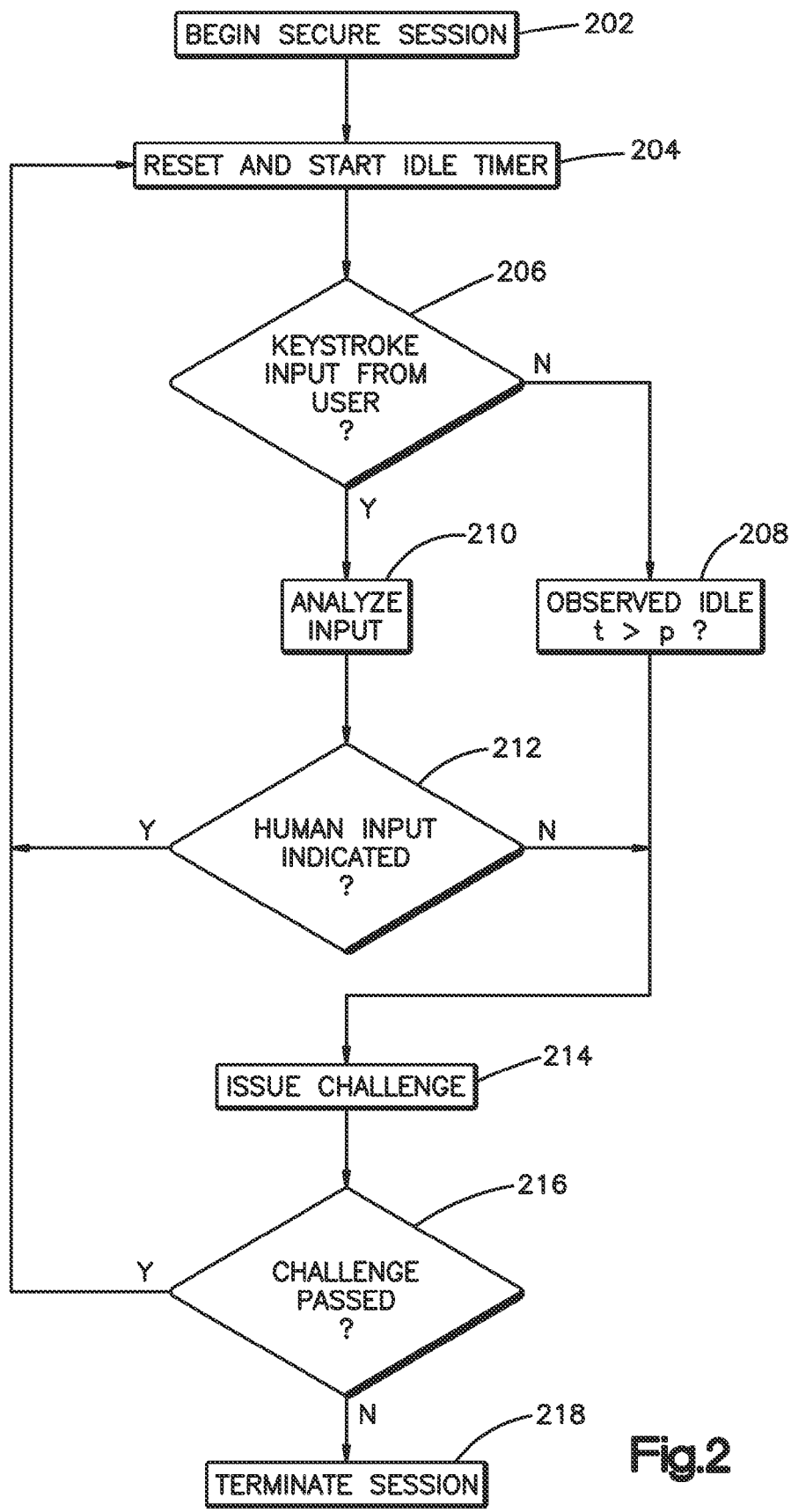
FIG. 2 illustrates a method for validating an active terminal session according to the present invention.

FIG. 2 illustrates a method according to the present invention. At 202 a secure session terminal session commences with an authorized user, for example one logged on through user ID and password inputs through a SSH session manager. At 204 an idle session timer is reset and started. When an elapsed time period of idleness t observed by the session manager at 206 from the authorized user exceeds a predetermined time-out period p at 208 session termination procedures are initiated through issuance of a challenge at 214.

If instead user input is observed at 206, then the input is analyzed for human-like behavior attributes at 210, for example including keystroke and/or sequence analysis as described generally above. At 212 if analysis indicates that the input at 206 is likely or probably human input from an active user then the idle timer is reset at 204 in response to the input. However, if analysis instead indicates that the input at 206 is likely or probably non-human automated input, then a challenge is issued to the user at 214.

If the user passes the challenge at 216 then the session manager resets the idle timer at 204 and the active terminal session continues. If however the user fails the challenge at 216 then the session manager terminates the active session at 218.

II. Computerized Implementation

Figure 3:
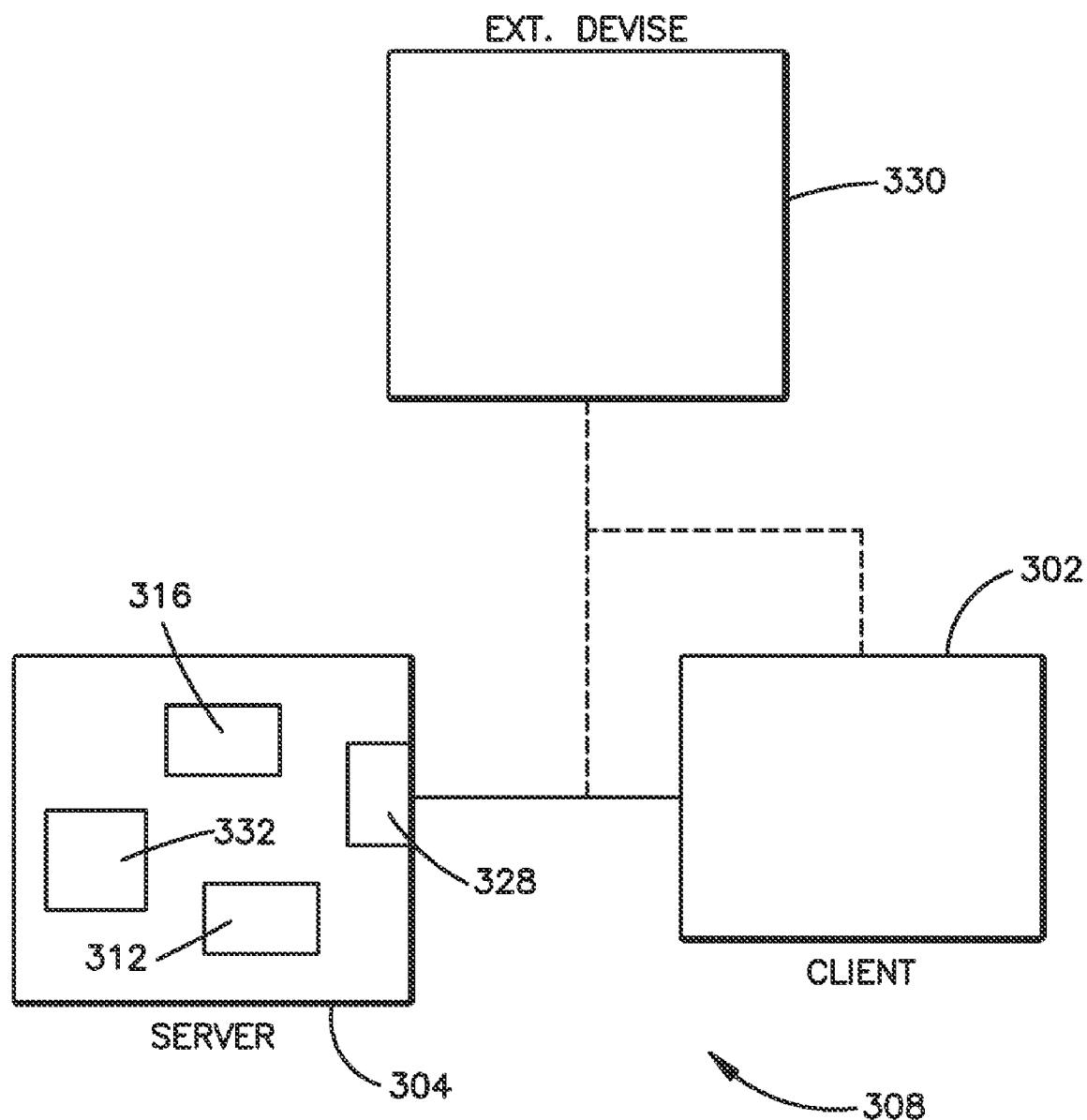
FIG. 3 illustrates a computer system appropriate for validating an active terminal session according to the present invention.

Referring now to FIG. 3, an exemplary computerized implementation of the present invention includes a network computer 304 in communication with a client device 302 through a computer network infrastructure 308. This is intended to demonstrate, among other things, that the present invention could be implemented within a network environment (e.g., the Internet, a wide area network (WAN), a local area network (LAN), a virtual private network (VPN), etc.), or on a stand-alone computer system. Communication throughout the network 308 can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 308 is intended to demonstrate that some or all of the components of the detection application components (such as elements 122,124,128,128,130 illustrated in FIG. 1) can be deployed, managed, serviced, etc. by a service provider who offers to implement, deploy, and/or perform the functions of the present invention for others.

As shown, the network computer 304 includes a processing unit 312 in communication with one or more external I/O devices/resources 328 and storage systems 332. In general, the processing unit 312 executes computer program code, such as the code to implement one or more of the detection application components 122,124,128,128,130 which is stored in memory 316 and/or a storage system 332.

The network infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, the network computer 304 is only representative of various possible computer systems that can include numerous combinations of hardware.

To this extent, in other embodiments, the network computer 304 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 328 can comprise any system for exchanging information with one or more of the external device 330. Still further, it is understood that one or more additional components (e.g., system software, math co-processing unit, etc.) not shown in FIG. 3 can be included in the network computer 304. However, if the network computer 304 comprises a handheld device or the like, it is understood that one or more of the external devices 330 (e.g., a display) and/or the storage system 332 could be contained within the network computer 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into the network computer 304.

While shown and described herein as a method and system for validating an active terminal session managing conference calls, it is understood that the invention further provides various alternative embodiments. For example, in one embodiment, the invention provides a computer-readable/useable medium that includes computer program code to enable a computer infrastructure to validate an active terminal session. To this extent, the computer-readable/useable medium includes program code that implements each of the various process steps of the invention.

It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage one or more of the active terminal session validation components 122,124,128,128,130. In this case, the service provider can create, maintain, and support, etc., a computer infrastructure, such as the network computer infrastructure 308 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the active terminal session validation components 122,124,128, 128,130. In this case, a computer infrastructure, such as the computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A system for validating an active terminal session, comprising:
    a processing device in communication with an idle session timer, an authorized terminal device, computer readable memory and a computer readable storage media;
    first instructions to analyze non-idle keystroke input from an authorized terminal device and ascertain human-like behavior as a function of a timing characteristic of the keystroke input during an open active terminal session;
    second instructions to determine whether the terminal device input is likely from a human user or from an automaton in response to the timing characteristic; and
    third instructions to:
        terminate the session, generate a time-out warning to the user or present a challenge to the user in response to a determination that the terminal device input is likely from an automaton;
        manipulate the idle session timer in response to a determination that the terminal device input is likely from a human user or to the user passing the challenge; or
        terminate the session in response to the user failing the challenge;
    wherein the timing characteristic is at least one of a maximum generation rate, a burstiness indicated by keystroke intensity over a given time period, and a predictable keystroke sequence delay between certain keystrokes in a specified sequence due to an ease or a difficulty of finger manipulations required to generate the specific sequence through a known input element; and
    wherein the first, second and third program instructions are stored on the computer readable storage media for execution by the processing device via the computer readable memory.

2. The system of claim 1 wherein the first instructions are further to:
    generate a keystroke humanness likelihood output in response to the timing characteristic; and
    wherein the second instructions are further to determine whether the terminal device input is likely from a human user or from an automaton as a function of the keystroke humanness likelihood output.

3. The system of claim 2 wherein the challenge is a Completely Automated Public Turing Test to tell Computers and Humans Apart challenge.

4. The system of claim 2 wherein the first instructions are further to parse a command pattern of the terminal device keystroke input for a command characteristic determinative of whether the keystroke input changes a state of a host computer in communication with the terminal device, and to responsively generate a command humanness likelihood output; and
    wherein the second instructions are to determine whether the terminal device input is likely from the human user or from the automaton as a function of the keystroke humanness likelihood output and the command humanness likelihood output by applying a weighting algorithm or an artificial intelligence routine.

5. The system of claim 4 wherein the third instructions are further to interrupt a user session and present the user with a URL showing where the challenge is being presented.

6. The system of claim 4 wherein the first instructions are further to parse the command pattern for the command characteristic through an affinity for a command line interface of a platform of the host computer; and
wherein the command characteristic is at least one of a no-action-required characteristic indicated by the parsed command pattern comprising a plurality of enter key keystrokes that are not associated with a meaningful input, and a query characteristic indicated by the parsed command pattern comprising a sequence of query commands that each query for a response from the host computer but do not change the state of the host computer.

7. A method for validating an active terminal session, comprising:
ascertaining a human-like behavior likelihood of non-idle keystroke input from an authorized terminal device via a processing device during an open active terminal session by a user by analyzing the keystroke input for a timing characteristic and generating a keystroke humanness likelihood output in response to the timing characteristic;
determining whether the terminal device input is likely from a human user or from an automaton as a function of the keystroke humanness likelihood output;
terminating the session, generating a time-out warning to the user or presenting a challenge to the user in response to determining that the input is likely from an automaton;
manipulating an idle session timer in response to determining that the input is likely from a human user or to the user passing the challenge;
terminating the session in response to the user failing the challenge; and
wherein the timing characteristic is at least one of a maximum generation rate, a burstiness indicated by keystroke intensity over a given time period, and a predictable keystroke sequence delay between certain keystrokes in a specified sequence due to an ease or a difficulty of finger manipulations required to generate the specific sequence through a known input element.

8. The method of claim 7 wherein the step of presenting a challenge comprises presenting a Completely Automated Public Turing Test to tell Computers and Humans Apart to the terminal user.

9. The method of claim 7 wherein the ascertaining the human-like behavior likelihood of the keystroke input further comprises parsing a command pattern of the keystroke input for a command characteristic determinative of whether the keystroke input changes a state of a host computer in communication with the terminal device, and generating a command likelihood output in response to the command characteristic;
wherein the step of determining whether the terminal device input is likely from the human user or from the automaton is a function of applying a weighting algorithm or applying an artificial intelligence routine to the keystroke humanness likelihood output and the command likelihood output; and
wherein the command characteristic is at least one of:
a no-action-required characteristic indicated by the parsed command pattern comprising a plurality of enter key keystrokes that are not associated with a meaningful input; and
a query characteristic indicated by the parsed command pattern comprising a sequence of query commands that each query for a response from the host computer but do not change the state of the host computer.

10. The method of claim 9 wherein the parsing the command pattern for the command characteristic is through an affinity for a command line interface of a platform of the host computer.

11. A computer-readable storage device storing executable program code instructions, the executable program code instructions comprising:
first instructions to ascertain a human-like behavior likelihood of non-idle input from an authorized terminal device during an open active terminal session and responsively generate a keystroke humanness likelihood output as a function of a timing characteristic of the keystroke input;
second instructions to determine whether the terminal device input is likely from a human user or from an automaton as a function of the keystroke humanness likelihood output; and
third program instructions to:
terminate the session, generate a time-out warning to the user or present a challenge to the user in response to determining that the input is likely from an automaton;
manipulate an idle session timer in response to determining that the input is likely from a human user or to the user passing the challenge; and
terminate the session in response to the user failing the challenge;
wherein the timing characteristic is at least one of a maximum generation rate, a burstiness indicated by keystroke intensity over a given time period, and a predictable keystroke sequence delay between certain keystrokes in a specified sequence due to an ease or a difficulty of finger manipulations required to generate the specific sequence through a known input element.

12. The computer-readable storage device of claim 11 wherein the third instructions are to present a Completely Automated Public Turing Test to tell Computers and Humans Apart as the challenge.

13. The computer-readable storage device of claim 11 wherein the first instructions are further to ascertain the human-like behavior likelihood of the keystroke input by parsing a command pattern of the keystroke input for a command characteristic determinative of whether the keystroke input changes a state of a host computer in communication with the terminal device, and generating a command likelihood output in response to the command characteristic; and
wherein the second instructions are further to determine whether the terminal device input is likely from the human user or from the automaton as a function of applying a weighting algorithm or applying an artificial intelligence routine to the keystroke humanness likelihood output and the command likelihood output.

14. The computer-readable storage device of claim 13 wherein the first instructions are further to parse the command pattern for the command characteristic through an affinity for a command line interface of a platform of the host computer.

15. The computer-readable storage device of claim 14 wherein the command characteristic is at least one of:
a no-action-required characteristic indicated by the parsed command pattern comprising a plurality of enter key keystrokes that are not associated with a meaningful input; and a query characteristic indicated by the parsed command pattern comprising a sequence of query commands that each query for a response from the host computer but do not change the state of the host computer.

16. A service for validating an active terminal session, the service comprising:
  providing a computer infrastructure that:
  ascertains a human-like behavior likelihood of non-idle input from an authorized terminal device during an open active terminal session and responsively generates a keystroke humanness likelihood output as a function of a timing characteristic of the keystroke input;
  determines whether the terminal device input is likely from a human user or from an automaton as a function of the keystroke humanness likelihood output; and
  terminates the session, generates a time-out warning to the user or presents a challenge to the user in response to determining that the input is likely from an automaton;
  manipulates an idle session timer in response to determining that the input is likely from a human user or to the user passing the challenge;
  terminates the session in response to the user failing the challenge; and
  wherein the timing characteristic is at least one of a maximum generation rate, a burstiness indicated by keystroke intensity over a given time period, and a predictable keystroke sequence delay between certain keystrokes in a specified sequence due to an ease or a difficulty of finger manipulations required to generate the specific sequence through a known input element.

17. The service of claim 16 wherein the presented challenge is a Completely Automated Public Turing Test to tell Computers and Humans Apart.

18. The service of claim 16 wherein the computer infrastructure further:
  ascertains the human-like behavior likelihood of the keystroke input by parsing a command pattern of the keystroke input for a command characteristic determinative of whether the keystroke input changes a state of a host computer in communication with the terminal device;
  generates a command likelihood output in response to the command characteristic; and
  determines whether the terminal device input is likely from the human user or from the automaton as a function of applying a weighting algorithm or applying an artificial intelligence routine to the keystroke humanness likelihood output and the command likelihood output.

19. The service of claim 18 wherein the computer infrastructure parses the command pattern for the command characteristic through an affinity for a command line interface of a platform of the host computer.

20. The service of claim 19 wherein the command characteristic is at least one of:
  a no-action-required characteristic indicated by the parsed command pattern comprising a plurality of enter key keystrokes that are not associated with a meaningful input; and
  a query characteristic indicated by the parsed command pattern comprising a sequence of query commands that each query for a response from the host computer but do not change the state of the host computer.

* * * * *